(No Model.)

T. GADDES.
TEA OR COFFEE POT STRAINER.

No. 569,188. Patented Oct. 13, 1896.

Witnesses.
Annie L. Gaddes
Isabella Kinghorn

Inventor.
Thomas Gaddes

UNITED STATES PATENT OFFICE.

THOMAS GADDES, OF HARROWGATE, ENGLAND.

TEA OR COFFEE POT STRAINER.

SPECIFICATION forming part of Letters Patent No. 569,188, dated October 13, 1896.

Application filed August 23, 1895. Serial No. 560,229. (No model.) Patented in England February 19, 1894, No. 3,520, and in Germany February 26, 1895, No. 36,675.

*To all whom it may concern:*

Be it known that I, THOMAS GADDES, a subject of the Queen of Great Britain, residing at 104 Station Parade, Harrowgate, in the county of York, England, have invented a Strainer Applicable to Teapots, Coffee-Pots, Wine-Bottles, or other Like Receptacles, (for which I have received Letters Patent in England, No. 3,520, dated February 19, 1894, and also utility model patent in Germany, No. 36,675, dated February 26, 1895;) and I do hereby declare that the following is a specification of the said invention.

The apparatus consists of a tubular funnel terminating in a lip, or the lip may be absent. At the other extremity is a disk of rubber or such other elastic substance, retained in a suitable extension of the funnel. This elastic disk is perforated, and through the perforation passes the spout of a tea or coffee pot or other like receptacle, and by means of which the strainer is secured thereto. The box or extension of the funnel retains the elastic disk, and by means of two opposable ridges the disk is gripped. Within the funnel is a sieve or strainer of gauze or perforated metal.

To elucidate the foregoing description, I shall now refer to the accompanying drawings.

Figure 1:
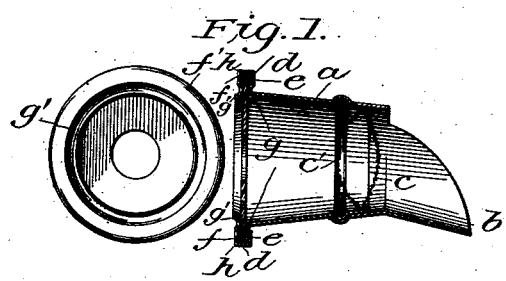
Figure 2:
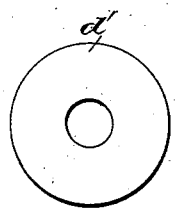
Figure 2:
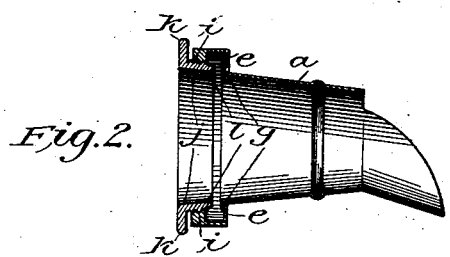

Figure 1 is a horizontal section of a strainer in which the disk and lid of the box are fixed by the margin of the box being planished over, the disk and the lid being also shown in elevation. Fig. 2 is a section of a spout, showing a lid which can be screwed off and the disk removable.

In Fig. 1 the tubular funnel $a$ may terminate in a lip $b$, and the sieves $c$ $c'$ are caught with solder and shown in position within the funnel $a$. The elastic disk $d$ (also shown in elevation $d'$) is contained in the box $e$, the lid or cover of which, $f$, is likewise shown in $f'$. The elastic disk is secured in the box by the bossed ridges $g$ $g'$, the lid or cover of which is fixed by the edge $h$ of the box $e$ being planished over, or the entire box $e$ may be flared out of the funnel substance; or, in place of this lid or cover $f$ the circumference of the box $e$, Fig. 2, may be threaded internally, as $i$, and the male portion $j$, which screws into this, having a milled flange $k$, impinges with its rounded edge $l$ against the rubber disk and in apposition with the bossed ridge $g$ of the funnel $a$. By this arrangement the rubber disk can readily be removed for cleaning or other purposes.

Having now particularly described and ascertained the nature of my said invention and in what manner the same is to be performed, what I claim, and desire to secure by Letters Patent, is—

In a strainer for teapots, coffee-pots, wine-bottles, the combination of the funnel or spout $a$, provided at one end with the lip $b$, and at the other end with the box $e$, and a perforated elastic disk secured in the said box, the said spout being provided with one or more than one sieve.

THOMAS GADDES.

Witnesses:
ANNIE L. GADDES,
ISABELLA KINGHORN.